Sept. 14, 1954

J. J. KOWALIK 2,688,938

SNUBBED TRUCK

Filed Oct. 20, 1950

INVENTOR.
John J. Kowalik
BY
Atty.

Sept. 14, 1954 J. J. KOWALIK 2,688,938
SNUBBED TRUCK
Filed Oct. 20, 1950 3 Sheets-Sheet 2
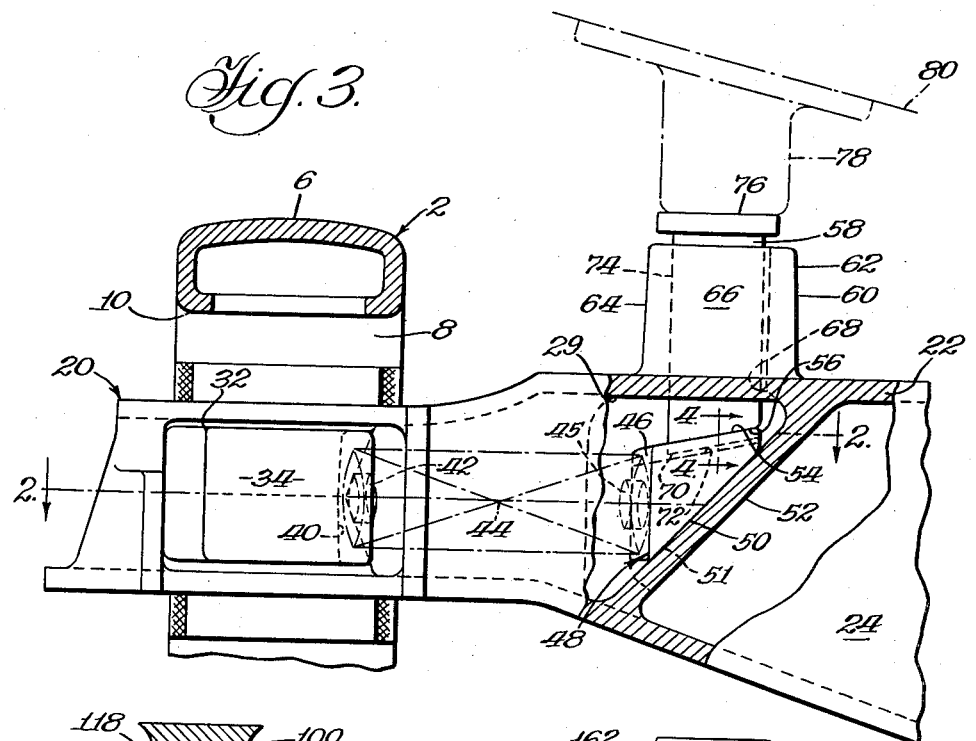
Fig. 3.
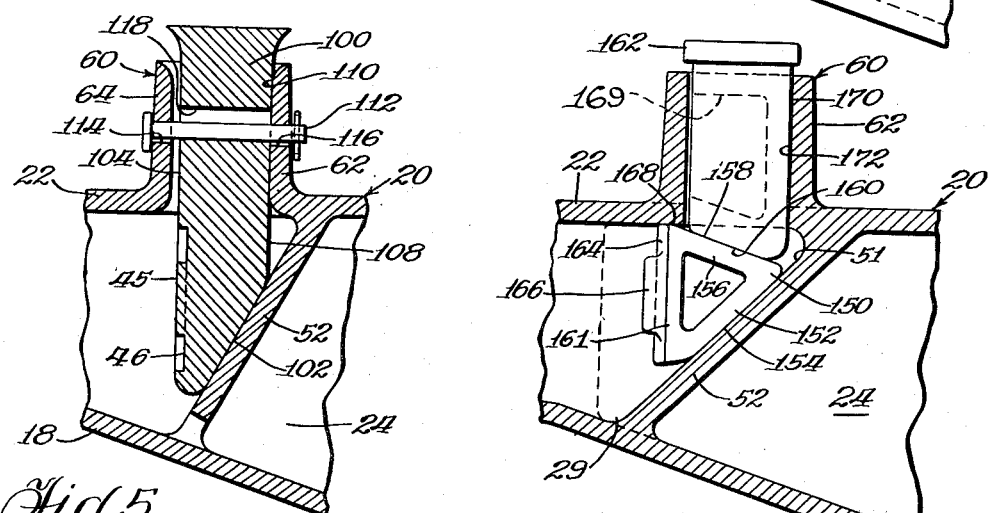
Fig. 5. Fig. 6.
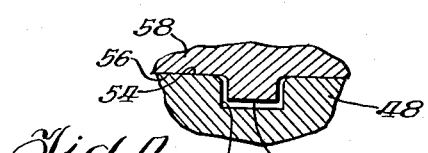
Fig. 4.
INVENTOR.
John J. Kowalik
BY
[signature]
Atty.

Sept. 14, 1954  J. J. KOWALIK  2,688,938
SNUBBED TRUCK
Filed Oct. 20, 1950  3 Sheets-Sheet 3
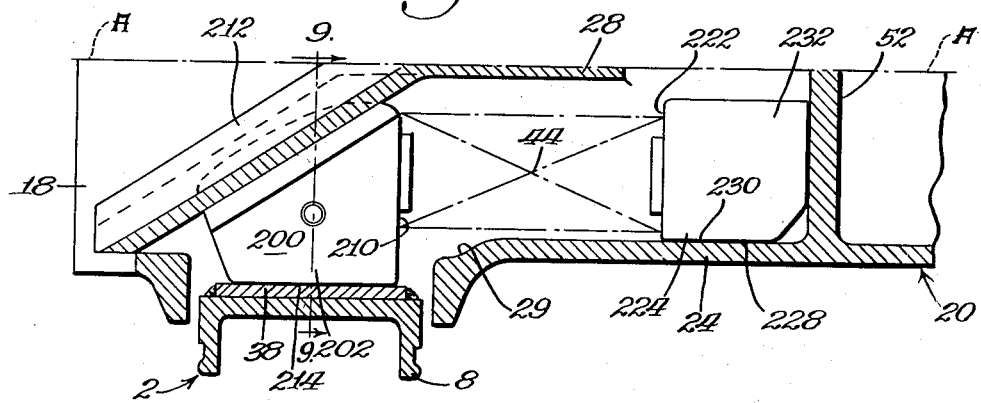
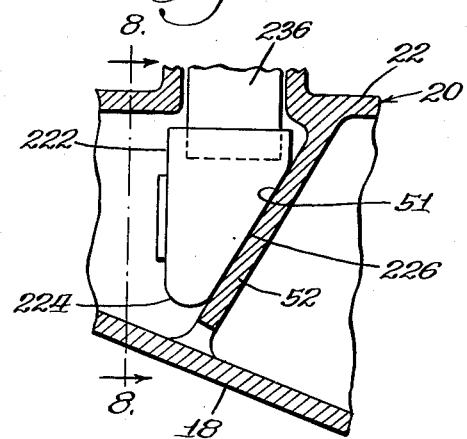
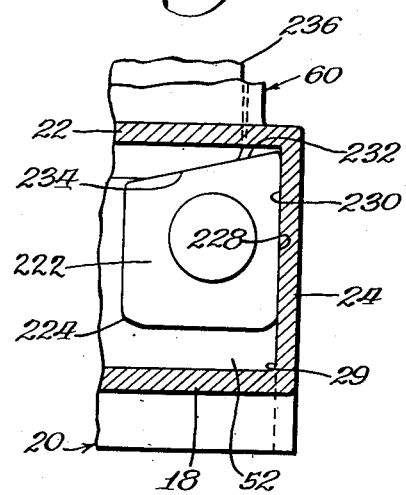
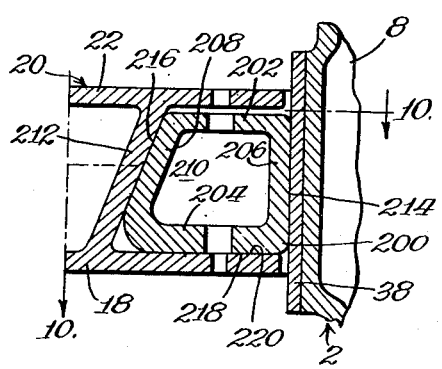
INVENTOR.
John J. Kowalik
BY
Atty.

Patented Sept. 14, 1954

2,688,938

UNITED STATES PATENT OFFICE 2,688,938

SNUBBED TRUCK

John J. Kowalik, Chicago, Ill., assignor to American Steel Foundries, Chicago, Ill., a corporation of New Jersey Application October 20, 1950, Serial No. 191,284

11 Claims. (Cl. 105—197)

1

This invention relates to railway car trucks and more particularly to a novel arrangement of friction means in a truck to control relative movements between the load-carrying truck parts and between the truck and the car body carried thereby.

A general object of the invention is to provide novel snubbing means for controlling lateral sway of a car body through frictional resistance acting between the truck frames and the body bolsters.

A more specific object of the invention is to provide means carried by the truck bolsters for frictional engagement with the side frames, the friction means also cooperating with the body bolsters on a car body carried by the truck bolsters.

A further object of the invention is to provide a combined side bearing and spring damping means.

Another object of the invention is to arrange a side bearing to act through friction shoes engaging the side frames to resist downward movement of the truck bolster when a load is imposed on the side bearing by movement of the car body.

The invention contemplates the provision of friction shoes at opposite sides of a truck bolster in vertical face engagement with side frame columns, the shoes being actuated by springs which also actuate a side bearing extending through the top of the truck bolster for engagement by the body bolster of a car body carried by the truck bolster whereby as the car body bolster compresses the side bearing, the friction shoes are urged under greater pressure against the side frame columns thereby increasing the resistance of the truck bolster moving downwardly.

These and other objects of the invention will become more apparent from the specification and the drawings, wherein:

Figure 3 is a sectional view on the line 3—3 of Figure 1, with the truck bolster partly broken away and the body bolster shown in phantom lines.

Figure 4 is a fragmentary sectional view taken substantially on the line 4—4 of Figure 3;

2

Figure 1:
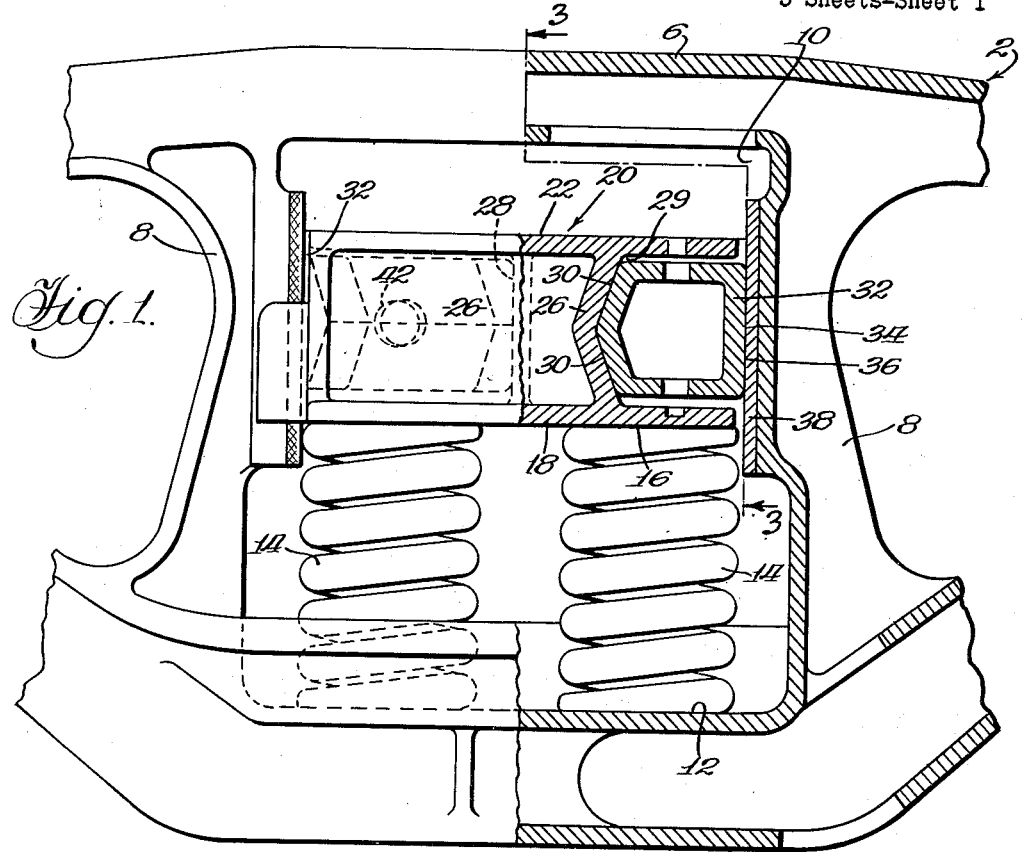
Figure 1 is a fragmentary side elevational view partly in section of a railway car truck incorporating one form of the invention, the section being taken substantially in the plane, indicated by the line 1—1 of Figure 2.

Figure 5 is a fragmentary vertical sectional view longitudinally of the bolster and illustrating a modification of the invention;

Figure 6 is a view comparable to Figure 5 showing a further modification, the wedge and side bearing being shown in elevation;

Figures 7 to 10 illustrate a further modification of the invention, Figure 7 being comparable to Figure 6, Figure 8 being a fragmentary transverse sectional view taken substantially on the line 8—8 of Figure 7;

Figure 9 being a fragmentary vertical transverse sectional view taken substantially on the line 9—9 of Figure 10, and Figure 10 being a fragmentary sectional view taken substantially on the line 10—10 of Figure 9.

Describing the invention in detail and first referring to the embodiment shown in Figures 1 through 4, the railway car truck comprises a side frame generally indicated 2 at each side thereof which is of conventional design and each side frame comprises tension and compression members 4 and 6 and spaced columns 8, 8 interconnecting the tension and compression members centrally of the frame and forming a bolster opening 10 therewith. The tension member affords a spring seat 12 at the bottom of the bolster opening upon which are seated a plurality of coil springs 14, 14, the upper ends of the springs bearing as at 16 against the underside of a bottom wall 18 of a bolster, generally indicated 20.

The bolster 20 is a box section member and comprises a top wall 22 connected at opposite sides of the bolster by side walls 24, 24 to the bottom wall 18. The end portion of the bolster is formed with walls 26, 26, which converge inwardly of the bolster toward the longitudinal vertical center plane of the bolster. The walls 26, 26 merge into the outboard extremity of a substantially vertical center rib 28, which interconnects the top and bottom walls 22 and 18 of the bolster and forms pockets 29, 29 therewith at opposite sides of the bolster. Each wall 26 is V-shaped in vertical section as will be seen in Figure 1 and affords a slidable seat along its respective faces as at 30, 30 for a friction shoe 32, positioned within the associated pocket 29.

Figure 2:
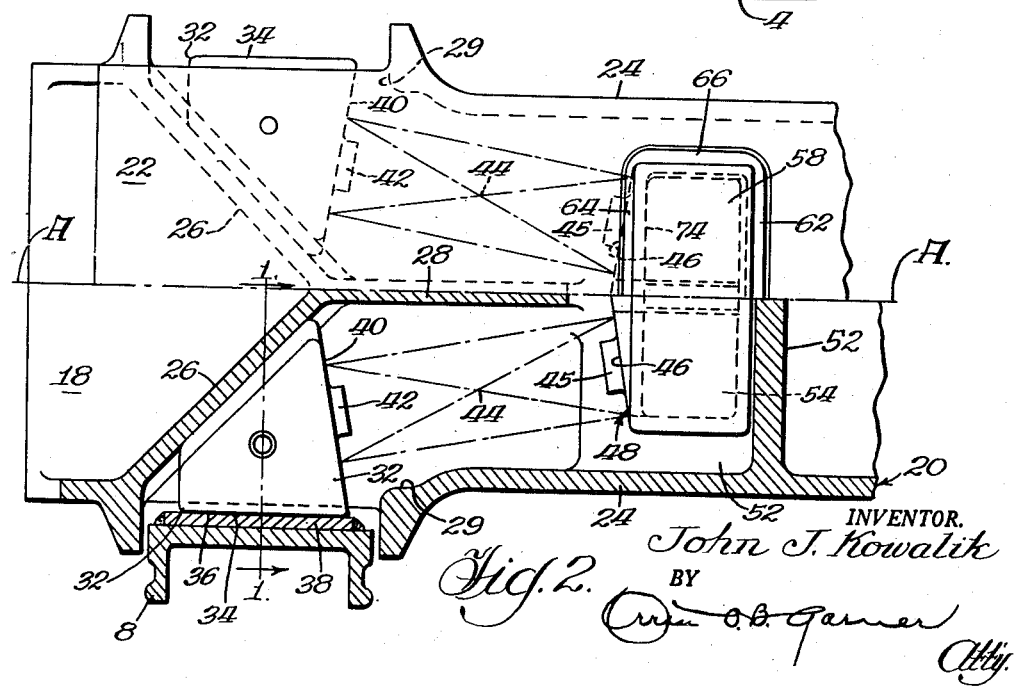
Figure 2 is a plan view partly in section, the section being taken substantially in the planes indicated by the line 2—2 of Figure 3.

The shoe preferably presents an outer vertical friction face 34 for engagement as at 36 with a wear plate 38 mounted on an adjacent column 8 in any convenient manner as by welding. Each friction shoe 32 is a hollow member of substantially triangular form in plan, as seen in Figure 2 and at its inner side affords a spring seat 40 with centrally arranged spring positioning means 42 for one end of a coil spring 44 diagrammatically shown in Figures 2 and 3. The spring 44 extends substantially horizontally longitudinally of the bolster within the associated pocket 29 and is disposed inboardly of the associated shoe 32. The springs 44, 44 at opposite sides of the bolster are preferably arranged with their axes converging toward the longitudinal vertical center plane A—A (Figure 2) of the bolster. The inner ends of the springs 44, 44 preferably bear against seats 46, 46 of a spring actuator or wedge, generally indicated 48. The seats 46, 46 are at the outboard side of the wedge 48 and converge toward the plane A—A of the bolster in a direction outboardly of the bolster. The seats 46, 46 are substantially normal to the axes of the respective springs 44, 44, and the seats 40, 40 on the respective shoes 32, 32 are substantially normal to the axes of the respective springs 44, 44.

The wedge 48 comprises a diagonal wedge face 50 (Figure 3) on its bottom side in wedge engagement with the top side of a diagonal wall 52. The face 50 and the web 52 slope downwardly in a direction outboardly of the bolster. The web 52 interconnects the top and bottom walls and the side walls of the bolster. The wedge 48 is provided on the top side thereof with a diagonal wedge surface 54 which slopes downwardly outboardly of the bolster, preferably at a lesser angle than its bottom surface 50. The surface 54 is engaged by a complementary wedge surface 56 on the bottom end of a side bearing plunger member 58, said plunger member extending through a box 60 projecting from the top side of the bolster and integral with the top wall 22 thereof. The box 60 may be of rectangular form and may comprise spaced inboard and outboard walls 62 and 64, interconnected by an end wall 66 at each end.

The plunger member 58 fits loosely in the box 60 and through an opening 68 in the top wall 22 of the bolster and on its bottom side substantially centrally thereof is formed with a tongue 70 (Figure 4) which extends into a slot 72 formed centrally in the top side of the wedge member 48. Thus the wedge member 48 is interlocked with the side bearing member 58 to maintain the parts in vertical alignment. The plunger member 58 has frictional engagement on its outboard side as at 74 with the inner side of the outboard wall 64 of the box 60. The upper end of the member 58 is engaged as at 76 by the bottom end of a body bolster side bearing 78, the side bearing 78 being of conventional design and suitably secured to the body bolster 80 of a car body (not shown) which is supported on the bolster 20 in conventional manner as will be readily understood by those skilled in the art.

Under normal conditions each side bearing 78 loads the side bearing plunger member 58 as seen in Figure 3. This causes the side bearing member 58 to slide on its bottom surface 56 against the top surface 54 of the wedge 48 in a direction toward the outboard end of the bolster. Thus the outboard side of the member 58 is caused to frictionally engage the inner side of the outboard wall 64 of the box 60. The springs 44 maintain the wedge 48 in wedging engagement with the wall 52 and with the bearing member 58. The springs simultaneously urge the shoes 32 outwardly of the pockets 29 into engagement with the wear plates 38. It will be noted that the car body is supported by a truck at each end and that each bolster 20 of each truck carries at each end a friction assembly such as shown. It will be understood that clearances are provided at the king pin connections between the car body bolsters and the truck bolsters so that normally the car body may angle longitudinally and laterally. If the car body angles longitudinally, the lower end of the car body causes the side bearings thereadjacent to be urged downwardly into the casings whereby the members 58 of these side bearings develop friction resistance at 74 and at the same time urge associated wedges 48 downwardly along webs 52 whereupon friction develops at 50 and between surfaces 54 and 56. Downward movement of these wedges 48 further compresses the associated springs 44, 44 (it will be understood that the springs 44, 44 are under initial compression) whereby the related shoes 32, 32 are urged under heavier pressure against the related columns 8, 8. The increased pressure of the shoes provides increased retardation to the downward movement of the related truck bolster thus affording greater than normal resistance to downward movement of the descending end of the car truck. It will be observed that when this downwardly moving end of the car body moves upwardly, the pressure on the friction system is reduced because of the outward movement of the affected side bearing members 58. This feature permits ready recovery of the associated end of the vehicle to normal position. A novel feature of this invention is that it provides for lower pressures to act on the friction shoes to control normal bolster movements so that wear between the columns and the shoes and between the shoes and the bolster is substantially reduced. Furthermore, common springs act between the friction shoes and the side bearing mechanism.

When the car body angles laterally, the down moving side of the car body actuates the side bearings in the path thereof which in turn causes greater pressure on the related shoes against the associated side frame to resist this movement of the car body.

Referring now to Figure 5 wherein parts similar to those in the previous embodiment are identified by corresponding reference numerals. It will be seen that the construction differs over the previous one in that a two piece wedge and side bearing construction shown in the previous embodiment is substituted by a one piece construction comprising a side bearing plunger member 100, which is formed at its lower end with a wedge surface 102 sloping downwardly toward the outboard side 104 of the member 100. The surface 102 engages a complementary diagonal surface on the top side of the web 52 of the bolster 20. The spring seats 46 are formed adjacent the lateral edges of the member 100 at the lower end of its outboard side 104 for seating the inner ends of the springs 44, 44, suitable positioning means 45 being provided centrally of each seat 46. It will be seen that in the normal fully extended position of the side bearing the member 100 seats on its inboard side 108 against the inner face 110 of the inboard wall 62 of the casing 60. The member 100 may be loosely retained in assembly with the casing 60 by means of a pin and key assembly 112 which may extend through openings 114 and 116 in the outboard and inboard walls 64 and 62 of the casing 60 and through an opening 118 extending transversely through the member 100.

Referring now to the embodiment shown in Figure 6 wherein parts identical with those in the previous embodiment are identified by corresponding reference numerals, the present embodiment differs from those previously shown only in the manner of wedging relationship between the wedge and the side bearing. In the present instance the wedge member 150 is substantially triangular shaped in end view and has a downwardly sloping diagonal wall 152 engaging on its bottom side as at 154 with the top side of the wall 52 of the bolster 20. The bottom side of the wall 152 and the top side of wall 52 slope downwardly in a direction outboardly of the bolster. The upper end of wall 152 merges with the lower end of a diagonal wall 156 of the wedge member 150, the wall 156 sloping downwardly in a direction inboardly of the bolster, preferably at an obtuse angle with respect to the portion of the wedge surface 51 above the surface 154. The top side of the wall 156 provides a wedge surface 158 which engages a complementary wedge surface 160 on the bottom end of a side bearing plunger member 162. It will be noted that the surfaces 158 and 160 slope downwardly inboardly of the bolster and extend transversely of the bolster. The lower and upper ends of walls 152 and 156 merge respectively with the bottom and top sections of a spring seat wall 161, the spring seat wall 161 presenting a spring seat area 164 adjacent each end of the wedge member 150. The surfaces 164 are similar to the surfaces 46 on the wedge 48 in Figure 2. Each area 164 has a spring-positioning lug 166 formed centrally thereof for positioning the adjacent end of the related actuating spring 44 (not shown).

In the present embodiment the upper end of the wedge 150 is formed to abut as at 168 against the underside of the top wall 22 of the bolster. This arrangement limits the movement of wedge member 150 inboardly of the bolster along the wall 52 under the urging of the associated springs 44.

The member 162 is preferably cored out as at 169 to define a hollow structure and has its inboard side 170 frictionally engaging the inner side 172 of the inboard wall 62 of the casing 60. It will be seen that downward movement of the member 162 is resisted not only by the resistance in the springs 44 to compression but also by the frictional resistance between surfaces 51 and 154, between surfaces 158 and 160, and between surfaces 170 and 172. It will be understood that the abutment at 168 between the wedge member 150 and the top wall 152 of the bolster limits the upward movement of the side bearing member 162.

It will be understood that the remaining construction of the device fragmentarily shown in Figure 6 is identical with that shown in the previous embodiments.

Referring now to the embodiment shown in Figures 7 through 10 wherein parts identical with those in the previous embodiments are identified with the same reference numerals, the friction shoes, generally indicated 200, are modified and are preferably of hollow construction. As best seen in Figure 9, each shoe comprises top and bottom walls 202 and 204 interconnected along one of their edges by a friction wall 206 and at their other edges by a wedge wall 208. The walls 208 and 206 converge toward the outboard extremity of the bolster. The inboard end of the shoe is provided with a substantially vertical spring seat wall 210 which merges with the adjacent edges of the other walls on the shoe.

The shoe wall 208 also slopes downwardly toward the longitudinal vertical center plane of the bolster and engages a similar sloping wall 212 of the bolster, the wall 212 merging at its upper and lower edges with the top and bottom walls 22 and 18 of the bolster. The wall 212 also converges in a horizontal plane, as shown in Figure 10, with respect to the longitudinal vertical center plane A—A of the bolster in a direction inboardly of the bolster. The present construction causes the shoe under the urging of the related spring 44 to engage on its wall 206 as at 214 with the adjacent friction panel 38. Simultaneously the wall 208 engages as at 216 the related wall 212 whereby the shoe is urged downwardly so that the flat bottom surface 218 on the bottom of wall 204 of the shoe engages a similar surface 220 on the top side of the bottom wall 18 of the bolster. This arrangement is designed to prevent vertical oscillation of the shoe during up and down movements of the bolster and thus prevent chattering. In addition the arrangement provides extensive frictional bearing areas between the shoe and the bolster to complement the action of the shoe actuating springs in resisting movements of the shoes into the bolster during movements of the bolster laterally thereof.

The actuating spring 44 is located within the pocket 29 of the bolster and extends substantially horizontally and axially generally parallel to the longitudinal vertical center plane of the bolster. It will be seen that the outer end of each spring 44 seats against the spring seat wall 210 of the related shoe and that the inner end of each spring 44 seats against the outboard substantially vertical side 222 of a wedge 224.

The wedge 224 comprises a diagonal surface 226 (Figure 7) on its inboard side in engagement with a complementary surface 51 on the wall 52 of the bolster 20. The wedge 224 also has one of its lateral sides 228 in engagement with the inner side 230 of the adjacent side wall 24 of the bolster. The top side of the wedge 224 is provided with a diagonal surface 232 which slopes downwardly from the side 228 transversely of the bolster toward the longitudinal vertical center plane of the bolster. It will be understood that the arrangement shown in Figure 10 is preferably duplicated on the opposite side of the plane A—A and that the present arrangement features two wedges 224, one at each side of the bolster. The surface 232 of each wedge 224 is in complementary engagement with a surface 234 on the bottom end of a side bearing plunger member 236, the upper end of the member 236 being formed and arranged for contact with the body bolster side bearing as in the previous arrangements.

The side bearing plunger member 236 extends through the box or casing 60, and it will be seen that the surfaces 234 are formed adjacent opposite lateral edges of the member 236 and that these surfaces converge downwardly toward the longitudinal vertical center plane of the bolster. In the present embodiment the construction of the surfaces 234 and 232 causes the wedges 224 at opposite sides of the bolster to be urged transversely of the bolster against the respective side walls 24 of the bolster while at the same time the surfaces 226 of these wedges engage the surface 51 of the bolster.

During operation of the device shown in Figures 7 to 10, downward movement of the side bearing plunger member 236 is resisted by frictional action of the wedge members along the side walls of the bolster and along the wall 52 of the bolster. The construction also tends to position the side bearing member 236 transversely of the bolster. The function of the present embodiment and of those previously described is generically the same in that the friction means are carried by the truck bolster and act between the body bolster and the side frame to control relative movements between the car body and the truck and also between the truck bolster and the truck frame.

I claim:

1. In a railway car truck, a side frame, a truck bolster spring-supported therefrom, a body bolster movably supported from the truck bolster, friction means carried by the truck bolster and engageable with the side frame to snub relative movement between the side frame and truck bolster, a member carried by the truck bolster engageable with the body bolster and movable in response to movement of the body bolster, and means in the truck bolster including yieldable force transmitting means operatively interconnecting the member and the friction means to transmit movement of the member to the friction means.

2. In a railway car truck, a side frame, a truck bolster spring-supported therefrom, a body bolster movably supported from the truck bolster, friction means carried by the truck bolster and engageable with the side frame to snub relative movement between the side frame and truck bolster, a member carried by the truck bolster engageable with the body bolster and movable in response to movement of the body bolster, and means in the truck bolster comprising wedge surfaces in the end portion of the truck bolster at each side thereof converging inboardly of the truck bolster, a wedge face in the truck bolster inboardly of the surfaces, said friction means engaging said surfaces and said member engaging said face, and spring means reacting between said friction means and said member for transmitting forces due to the movement of the member to the friction means.

3. A railway car truck according to claim 2, wherein said member extends upwardly through the truck bolster and at its lower end wedges directly with said face, and said face slopes downwardly toward the outboard end of the truck bolster and faces said surfaces.

4. In a railway car truck, a side frame, a truck bolster spring supported therefrom, a body bolster movably carried by the truck bolster, a side bearing member projecting upwardly from the truck bolster for engagement with the body bolster, wedge means in the truck bolster in direct engagement with said side bearing member, friction means carried by the truck bolster and engaging the side frame, and spring means in the bolster arranged to coact between said wedge means and friction means to urge said side bearing member and wedge means in cooperative relationship to resist downward movement of said member.

5. A railway car truck, according to claim 4, wherein said bearing member comprises a bottom surface sloping longitudinally of the bolster, friction faces on the bolster and member in engagement with each other, said wedge means comprising a wedge element having top and bottom angularly related surfaces sloping longitudinally of the bolster, the top surface engaging said bottom surface on the member, said wedge means also comprising a diagonal surface on the bolster sloping longitudinally of the bolster and engaging said bottom surface on said element, and said spring means acting substantially longitudinally of the bolster.

6. A railway car truck comprising a side frame with spaced friction surfaces, a truck bolster spring-supported from the frame between said surfaces, a body bolster movably supported from the truck bolster, a friction assembly in the truck bolster acting directly between the body bolster and said surfaces, said friction assembly comprising a side bearing assembly projecting through the top of said truck bolster and engageable with the body bolster, said side bearing assembly comprising a bearing member for contact with the body bolster, a casing on the truck bolster enclosing said member, and a wedge in wedge engagement with the truck bolster and said member, said member frictionally engaging one side of the casing.

7. A truck, according to claim 6, wherein said wedge engages said member and truck bolster along converging wedge surfaces.

8. A truck, according to claim 6, wherein said wedge engages said member and truck bolster along wedge surfaces sloping downwardly in the same direction at different angles.

9. A truck, according to claim 6, wherein said wedge is split into two sections and each section frictionally engages a surface on the bolster extending longitudinally thereof.

10. In a railway car truck, a side frame resiliently supporting a truck bolster adjacent a column of said side frame, a load bolster movably supported by the truck bolster, a side bearing assembly extending vertically through the truck bolster and transmitting downwardly directed pressure exerted by the load bolster, and means to change the direction of said pressure consisting of a truck bolster supported wedge surface engaged by said assembly, a friction shoe having wedged support from said truck bolster, and flexible means directly engaging and positioned intermediate said assembly and said shoe and operative to horizontally urge said shoe into frictional engagement with said column.

11. In a railway car truck, spaced columns fixedly supported by a side frame, a truck bolster embraced therein, a load bolster movably carried thereby, said truck bolster having downwardly and inwardly converging wedge surfaces adjacent its end, another wedge surface inboardly of said surfaces, friction shoes slidably contacting said converging wedge surfaces and in pressured engagement with said columns, side bearing members supported by said other wedge surface and engaging said load bolster, and springs interconnecting said members and said shoes and operative to vary the pressured engagement of said columns in response to movement of said load bolster.

References Cited in the file of this patent

UNITED STATES PATENTS

| Number | Name | Date |
|---|---|---|
| 1,237,166 | Burrmann | Aug. 14, 1917 |
| 1,712,908 | Symington | May 14, 1929 |
| 1,788,130 | Symington | Jan. 6, 1931 |
| 1,888,940 | Symington | Nov. 22, 1932 |
| 2,403,045 | Buckwalter | July 2, 1945 |
| 2,444,009 | Grigsby | June 22, 1948 |
| 2,466,088 | Endsley | Apr. 5, 1949 |
| 2,485,508 | Pierce | Oct. 18, 1949 |
| 2,485,974 | Lehrman | Oct. 25, 1949 |
| 2,550,910 | Christenson | May 1, 1951 |